United States Patent
Rajan et al.

(10) Patent No.: US 8,468,537 B2
(45) Date of Patent: Jun. 18, 2013

(54) SYSTEMS AND METHODS FOR DISTRIBUTING VALIDATION COMPUTATIONS

(75) Inventors: Sreeranga P. Rajan, Sunnyvale, CA (US); Praveen K. Murthy, Fremont, CA (US); Indradeep Ghosh, San Jose, CA (US); Mukul Ranjan Prasad, San Jose, CA (US); Oksana I. Tkachuk, Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 324 days.

(21) Appl. No.: 12/836,375

(22) Filed: Jul. 14, 2010

(65) Prior Publication Data
US 2012/0017220 A1    Jan. 19, 2012

(51) Int. Cl.
    *G06F 9/46*    (2006.01)
(52) U.S. Cl.
    USPC ............................................. 718/104; 718/105
(58) Field of Classification Search
    None
    See application file for complete search history.

(56) References Cited

U.S. PATENT DOCUMENTS

| | | | |
|---|---|---|---|
| 5,502,816 A * | 3/1996 | Gawlick et al. | 709/227 |
| 6,950,107 B1 * | 9/2005 | Moreton et al. | 345/543 |
| 2004/0143833 A1 * | 7/2004 | Heyrman et al. | 718/100 |
| 2006/0064687 A1 | 3/2006 | Dostert | 718/1 |
| 2010/0275206 A1 * | 10/2010 | Mewhinney et al. | 718/100 |

OTHER PUBLICATIONS

Extended European Search Report; Application No. 11174036.1-1225; pp. 7, Oct. 25, 2011.
Melatti et al.; "Parallel and Distributed Model Checking in Eddy"; Int. J. Softw. Tools Technol. Transfer, vol. 11; pp. 13-25, 2009.

* cited by examiner

*Primary Examiner* — Camquy Truong
(74) *Attorney, Agent, or Firm* — Baker Botts L.L.P.

(57) ABSTRACT

In one embodiment, a method includes statically analyzing a validation toolkit environment. The method may also include, identifying a plurality of computational threads that do not share data structures with each other based on analysis of the validation toolkit environment. The method may additionally include calculating computational requirements of the computational threads. The method may further include distributing the threads among a plurality of resources such that the aggregate computational requirements of the computational threads are approximately evenly balanced among the plurality of resources.

12 Claims, 3 Drawing Sheets

SYSTEMS AND METHODS FOR DISTRIBUTING VALIDATION COMPUTATIONS

TECHNICAL FIELD

The present disclosure generally relates to testing hardware or software.

BACKGROUND

Advances in hardware and software have provided a foundation for increasingly complicated designs that are increasingly difficult to validate or verify. Validation (or verification) typically refers to checking or testing whether a hardware or software system or design meets one or more specifications and fulfills its intended purpose. Validation is often computationally intensive, and therefore, time consuming.

SUMMARY

The present invention provides a method and a system for distributing validation computations that substantially eliminates or reduces at least some of the disadvantages and problems associated with previous methods and systems.

In accordance with a particular embodiment of the present invention, a method may include a method includes statically analyzing a validation toolkit environment. The method may also include identifying a plurality of computational threads that do not share data structures with each other based on analysis of the validation toolkit environment. The method may additionally include calculating computational requirements of the computational threads. The method may further include distributing the threads among a plurality of resources such that the aggregate computational requirements of the computational threads are approximately evenly balanced among the plurality of resources.

Technical advantages of particular embodiments of the present invention include a methodology whereby the time required for application validation may be decreased and flexibility may be increased by allowing dynamic allocation of validation tasks to a cloud of computing resources.

Other technical advantages will be readily apparent to one skilled in the art from the following figures, descriptions, and claims. Moreover, while specific advantages have been enumerated above, various embodiments may include all, some or none of the enumerated advantages.

DESCRIPTION OF EXAMPLE EMBODIMENTS

Figure 1:
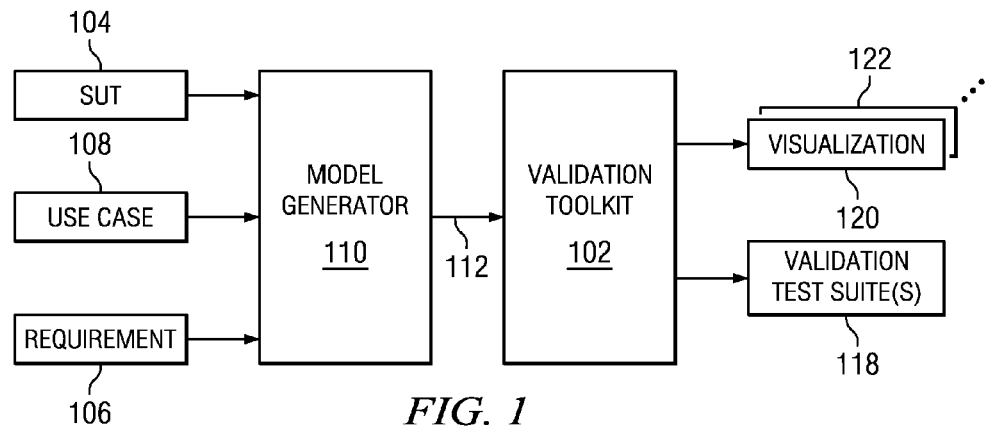
FIG. 1 illustrates an example environment of an example validation toolkit, in accordance with embodiments of the present disclosure.

FIG. 1 illustrates an example environment 100 of a validation toolkit 102, in accordance with embodiments of the present disclosure. In particular embodiments, validation toolkit 102 facilitates the validation of a software or hardware (or combination thereof) device or system under test (SUT) 104, testing whether the system satisfies one or more requirements or specifications 106 when carrying out one or more use cases 108 and outputting the results of such testing. By way of example, reference to a software system may encompass an application or a program, and vice versa, where appropriate. A requirement 106 of SUT 104 may be a particular behavior of the system that must occur or a particular property that must hold true during execution of the system. In some embodiments, inter-object specifications may be referred to as requirements while intra-object specifications may be referred to as executable specifications. Reference to behavior or a property may encompass a requirement 106, and vice versa, where appropriate. A use case 108 for SUT 104 may be a representation of a scenario that SUT 104 may encounter when a user uses SUT 104, such as for example a series of particular inputs from the user received by SUT 104 in a particular sequence. Reference to a scenario may encompass a use case, and vice versa, where appropriate. In particular embodiments, SUT 104 is a design prototype produced during development of a product. In other embodiments, SUT 104 may be a state machine or other representation generated by validation toolkit 102. Components of example environment 100 may execute or operate within one or more computer systems, such as those described in more detail below with reference to FIG. 5.

A user of validation toolkit 102 may specify one or more specifications or requirements 106 and/or use cases 108 for SUT 104 and communicate them to model generator 110 as input. Model generator 110 may access the SUT 104 for additional input. Model generator 110 may then generate a model 112 of SUT 104. In a particular embodiment, model generator 110 includes a graphical user interface (GUI) that facilitates user interaction in generating model 112 using a formal visual language or graphical modeling language. The graphical modeling language may be any suitable language and the model 112 may be created using any appropriate programming language or development tool.

In particular embodiments, model 112 is a high level design specification of SUT 104 generated using Unified Modeling Language (UML; e.g., UML 2.0). Broadly, UML is a standardized general purpose modeling language primarily utilized in the field of software engineering, and to a lesser extent, hardware engineering. UML includes a set of graphical notation techniques to create abstract models of specific systems. More particularly, UML is a collection of modeling notations for specifying different artifacts, such as requirements and design, of software and/or hardware systems. By way of example, UML may be utilized to facilitate the specification, visualization, construction and documentation of the artifacts of an object-oriented software-intensive system under development. However, UML may also be utilized to model other systems both prior to implementation or production as well as after production.

UML model 112 generally includes one or more diagrams used to specify or describe different attributes of SUT 104. In a practical application for a system of realistic size, tens or hundreds (or more) of UML diagrams may be used to accurately and completely describe SUT 104. Some or all of these UML diagrams may be arranged hierarchically. In other words, various UML diagrams may be incorporated into other higher level UML diagrams. In this way, a high level UML diagram may provide a more concise, simple, and visually pleasing overview of SUT 104 by referencing lower level UML diagrams rather than displaying all the details of each lower level UML diagram in the hierarchical higher level UML diagram (the reverse of this is known as flattening, whereby a hierarchically arranged UML is fleshed out to include and display all the details of the lower level UML diagrams that constitute the higher level UML diagram). Furthermore, in particular embodiments, validation toolkit 102 may, based on UML model 112, automatically generate executable validation test suite(s) 118 to verify and validate SUT 104. By way of example, the validation test suite(s) 118 may be generated in languages such as VERILOG, SYSTEMC, or JAVA.

Figure 2:
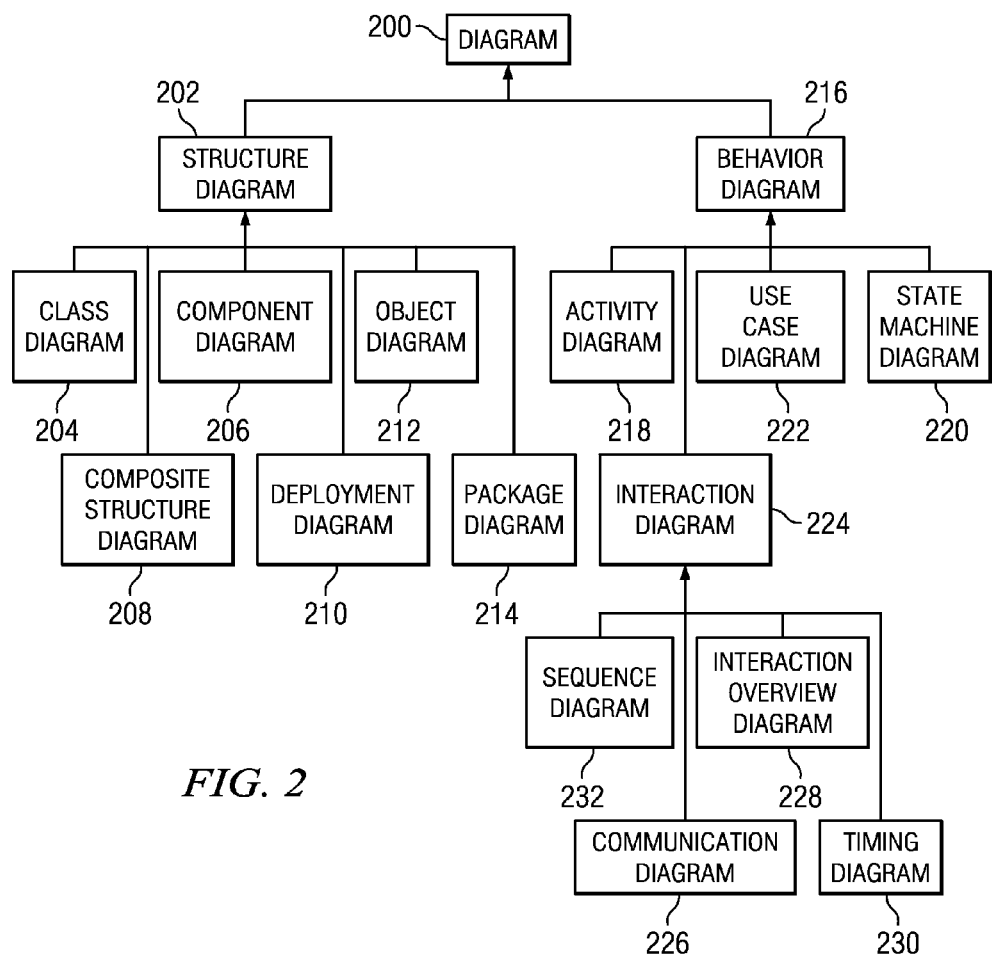
FIG. 2 illustrates an example hierarchical arrangement of Unified Modeling Language diagrams, in accordance with embodiments of the present disclosure.

UML diagrams may be generally classified into one of three categories based on what view they provide of the system model. These categories may be generally referred to as structural diagrams, behavioral diagrams, and interactions diagrams. In particular, UML 2.0 provides 13 different types of diagrams divided into these three categories. These diagrams can be categorized hierarchically as illustrated in FIG. 2.

A structural (or static) diagram 202 provides a view of the static structure of the system utilizing, by way of example, objects, attributes, operations, and relationships. Structure diagrams 202 include, by way of example, class diagrams 204, component diagrams 206, composite structure diagrams 208, deployment diagrams 210, object diagrams 212, and package diagrams 214.

A behavioral (or dynamic) diagram 216 emphasizes the dynamic behavior of the system by showing collaborations among objects and changes to the internal states of objects. Behavioral diagrams 216 include, by way of example, activity diagrams 218, state (or state machine) diagrams 220, and use case diagrams 222.

Interaction diagrams 224 may be considered a subset of behavioral diagrams 216. Interaction diagrams 224 emphasize the flow of control and data among the things in the system being modeled. Interaction diagrams include, by way of example, communication diagrams 226, interaction overview diagrams 228, timing diagrams 230, and sequence diagrams 232.

A sequence diagram in UML is a variety of interaction diagram that shows particularly how objects or processes operate with one another and in what order. More particularly, a primary use of a sequence diagram is to show the interaction between objects in the sequential order that those interactions occur. That is, a sequence diagram may be used to define event sequences that result in some desired outcome. Sequence diagrams may be utilized to validate and flesh out the logic of a use (or usage) scenario. A use scenario as used herein may be defined as a description of a potential way that SUT 104 is used. More particularly, a use scenario may represent a particular order and combination of messages communicated between two or processes. The logic of a usage scenario may be part of a use case, perhaps an alternate course; one entire pass through a use case, such as the logic described by the basic course of action or a portion of the basic course of action plus one or more alternate scenarios; or a pass through the logic contained in several use cases. Sequence diagrams facilitate the exploration of a design as they enable a user to visually step through the invocation of operations defined by the user's classes.

A sequence diagram may be considered a UML construct of a Message Sequence Chart (MSC). As those of skill in the art will appreciated, MSCs may be utilized in specifying scenarios that describe patterns of interactions between processes or objects. By way of example, in many object-oriented system development methodologies, a user first specifies a system's use cases and some specific instantiations of each use case are then described using MSCs.

While sequence diagrams are often utilized in software development, an organizations business staff may also utilize sequence diagrams to communicate how the business currently works by showing how various business objects interact. Besides documenting an organization's current model, a sequence diagram may also be used to specify requirements for a future business system implementation.

One of the primary uses of sequence diagrams is in the transition from requirements expressed as use cases to the next and more formal level of refinement. Use cases are often refined into one or more sequence diagrams. As eluded to earlier, in addition to their use in designing new systems, sequence diagrams may be used to document how objects in an existing (or legacy) system currently interact. This may be useful, for example, when transitioning a system to another person or organization.

Figure 3:
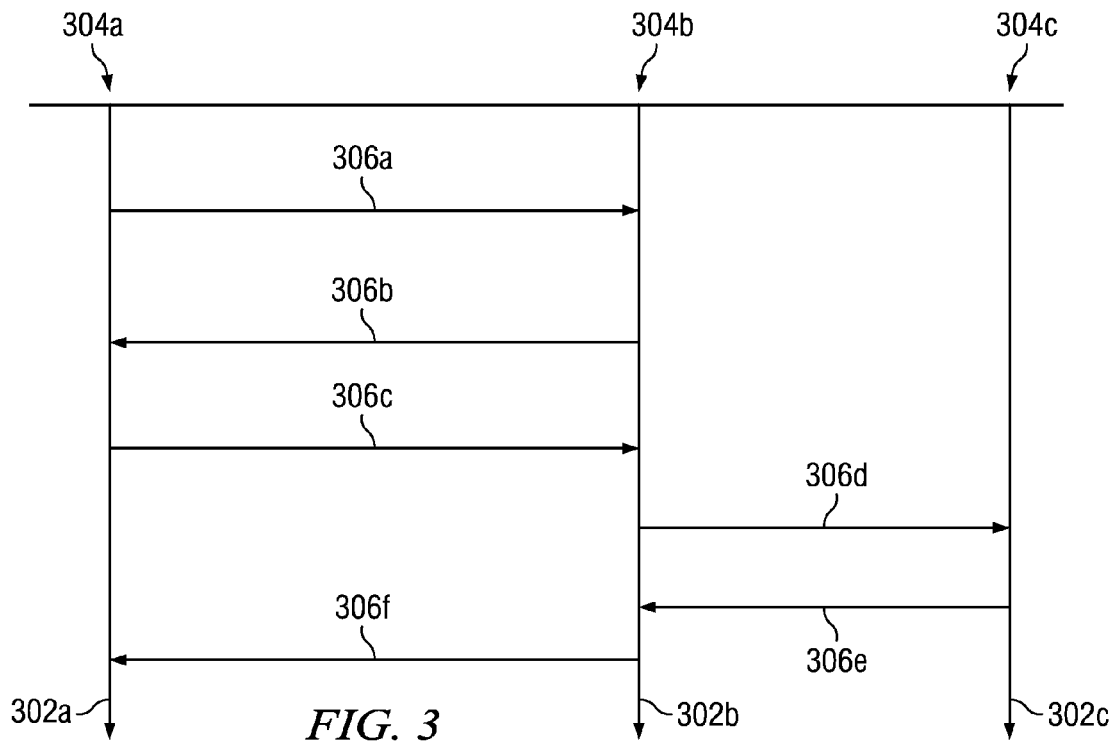
FIG. 3 illustrates an example sequence diagram, in accordance with embodiments of the present disclosure.

FIG. 3 illustrates an example sequence diagram 300, in accordance with embodiments of the present disclosure. The parallel vertical lines (or lifelines) 302 show different processes or objects 304 that run or operate simultaneously, while the horizontal arrows 306 represent the messages exchanged between them in the order in which they occur (time flows from top to bottom along the vertical lines). In this way, a sequence diagram provides a specification of runtime scenarios in a graphical manner. Some systems have simple dynamic behavior that may be expressed in terms of specific sequences of messages between a small, fixed number of objects or processes. In such cases, sequence diagrams may completely specify the system's behavior. However, a system's behavior is often much more complex such as, by way of example, when there are many branch points (e.g., exceptions), when there are complex iterations, or synchronization issues such as resource contention. In such cases, sequence diagrams may be used in conjunction with other behavioral diagrams such as state diagrams (state charts) and the other diagrams referred to above.

In many practical systems, there are times when one or more conditions must be met for a message to be sent to an object. Thus, when modeling object interactions, conditional constructs such as guards and loops may be utilized throughout UML diagrams to control flow. In particular embodiments, the elements in a diagram, such as a UML sequence diagram, may be specified with provisional or mandatory guards, corresponding to possible and necessary conditions, respectively. More particularly, if a provisional guard holds during an execution, control passes to the object immediately after the guard, and if it is false, the context in which this condition occurs is exited and execution may continue. By way of example, provisional guards may be used to program branches and if-then-else constructs. UML also enables bounded and unbounded loops, which, when combined with provisional guards, may be used to construct while loops and repeat-until loops. In contrast, a mandatory guard condition must always be true. If an execution reaches a mandatory guard that evaluates to false, this is a violation of the requirements of the SUT 104.

UML 2.0 introduced structured control (or conditional) constructs, such as InteractionUse and CombinedFragment to represent more complex flow of control in a sequence diagram. InteractionUse allows one sequence diagram to refer to another sequence diagram. Generally, a CombinedFragment is a form of a guard and may be used to group sets of messages together to show conditional flow in a sequence diagram. CombinedFragments represent different types of flows of control, such as concurrency, choice, and loops. A Combined- Fragment includes an InteractionOperator and one or more InteractionOperands. An InteractionOperand is an InteractionFragment and may contain an InteractionConstraint, which may be a Boolean expression. InteractionOperators include, by way of example, Alternatives (Alt), Options (Opt), Breaks, Parallels, Critical Regions, and Loops. The specifics of each of these InteractionOperators are known in the art and will not be described in further detail here.

Given its power and ability to incorporate conditional constructs, UML 2.0 is increasingly being used for formal specification of software and hardware systems, and particularly, at the design and requirements stage of the design process. However, the advantage of using formal specifications may be lost if there is no method by which the formal specification can be translated into an implementation, and so that the implementation can be checked systematically and automatically (since designs are large and human-based testing is error-prone and subject to incompleteness). Checking the implementation against the specification is especially important if it cannot be proven that the implementation meets the specification requirements (for example, this may be the case if the implementation is not generated systematically and in a provably correct way from the specification). As such, methods that generate validation suites from the formal specifications (e.g., UML) to test implementations are desirable.

Thus, as described above, validation may essentially comprise three tiers: model extraction, model reduction, and model verification. Each tier may be computationally intensive and take significant time to execute. To reduce computation time, various computational threads required to perform validation may be dynamically assigned to one or more computing resources (e.g., one or more processors, one or more computers, etc.) to enable parallel computation of such threads, as described in greater detail below.

Figure 4:
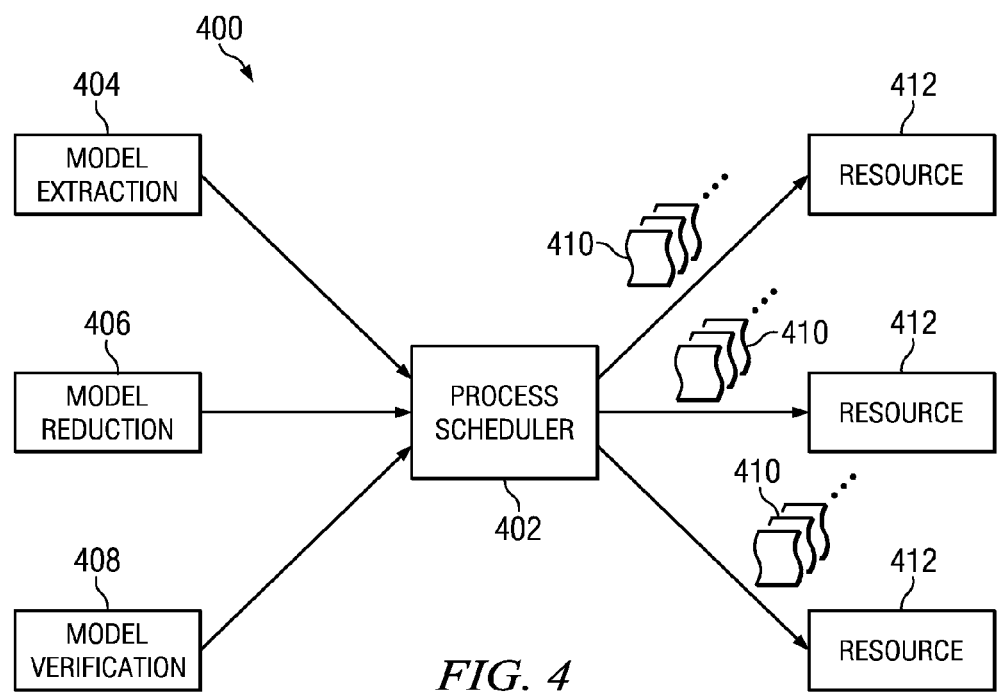
FIG. 4 illustrates an example environment of an example process scheduler, in accordance with embodiments of the present disclosure.

FIG. 4 illustrates an example environment 400 for a process scheduler 402, in accordance with embodiments of the present disclosure. As depicted, process scheduler 402 may statically analyze a model extraction tier 404, model reduction tier 406, and model verification tier 408. For example, model extraction tier 404 may be analyzed by analysis of model generator 110. As another example, model reduction tier 406 may be analyzed by analysis of model 112. As a further example, model verification tier 408 may be analyzed by analysis of validation toolkit 102. The various analyses may identify the various computational threads 410 that do not share data structures with each other and/or may calculate the computational resources required by each thread 410 (e.g., computation time, processing requirements, memory requirements, etc.), and may distribute such threads to a plurality of resources 412 (e.g., processors, computing devices, etc.) such that the aggregate computational requirements of the computational threads are approximately evenly balanced among the plurality of resources.

To further illustrate, as a specific example of analysis of model reduction tier 406, process scheduler 402 may analyze particular diagrams of model 112 (e.g., sequence diagram 232, state machine diagram 220, etc.). In performing such analysis, may extract various execution paths from such diagrams, wherein each path may include a sequence of states that traverses the diagram. In some embodiments, an exhaustive collection of execution paths may be extracted, such that each possible path of execution is represented. For each such path, process scheduler 402 may calculate the computation resources required to execute a thread representative of the path and/or may determine whether such thread requires a data structure used by another thread. For each thread 410 that does not require a data structure used by another thread, process scheduler 402 may distribute such thread 410 to a resource 412, such that the computational resources required by all such distributed threads are approximately balanced.

Accordingly, threads 410 may be dynamically provisioned among resources 412 in order to reduce computational time associated with validation. In addition, in certain embodiments, resources 412 may be components of a cloud computing environment, allowing execution of application validation to take place in a cloud.

Figure 5:
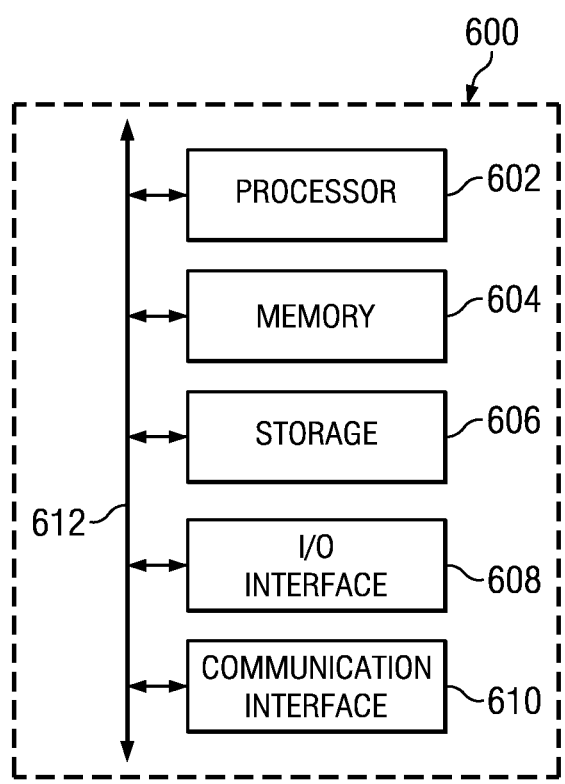
FIG. 5 illustrates an example architecture for an example computer system, in accordance with embodiments of the present disclosure.

FIG. 5 illustrates an example computer system 600, in accordance with embodiments of the present disclosure. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

A component of example environment 100 may include logic and/or other suitable element. Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   statically analyzing a validation toolkit environment by extracting a plurality of execution paths from a model generated by the validation toolkit environment;
   based on analysis of the validation toolkit environment, identifying a plurality of computational threads representative of each of the execution paths that do not share data structures with each other;
   calculating a computation resource requirements to execute each of the computational threads representative of the execution paths; and
   distributing the threads among a plurality of computation resources such that aggregate the computation resource requirements of the computational threads are approximately evenly balanced among the plurality of computation resources.

2. A method according to claim 1, wherein statically analyzing the validation toolkit environment comprises at least one of:
   analyzing a model generator of the validation toolkit environment;
   analyzing a model generated by the model generator; and
   analyzing a validation toolkit of the validation toolkit environment.

3. A method according to claim 1, wherein computational requirements include at least one of computation time, processing requirements, and memory requirements.

4. A method according to claim 1, wherein the resources are components of a cloud computing environment.

5. One or more non-transitory computer-readable storage media encoding software that is operable when executed to:
   statically analyze a validation toolkit environment by extracting a plurality of execution paths from a model generated by the validation toolkit environment;
   based on analysis of the validation toolkit environment, identify a plurality of computational threads representative of each of the execution paths that do not share data structures with each other;
   calculate a computation resource requirements to execute each of the computational threads representative of the execution paths; and distribute the threads among a plurality of computation resources such that aggregate the computation resource requirements of the computational threads are approximately evenly balanced among the plurality of computation resources.

6. Media according to claim 5, the software further operable to, when executed, in order to statically analyze the validation toolkit environment comprises at least one of:
analyze a model generator of the validation toolkit environment;
analyze a model generated by the model generator; and
analyze a validation toolkit of the validation toolkit environment.

7. Media according to claim 5, wherein computational requirements include at least one of computation time, processing requirements, and memory requirements.

8. Media according to claim 5, wherein the resources are components of a cloud computing environment.

9. A system comprising:
a processor; and
a memory coupled to the processor, the memory storing logic for execution by the processor, the logic comprising:
logic for statically analyzing a validation toolkit environment by extracting a plurality of execution paths from a model generated by the validation toolkit environment;
logic for identifying a plurality of computational threads representative of each of the execution paths that do not share data structures with each other based on analysis of the validation toolkit environment;
logic for calculating a computation resource requirements to execute each of the computational threads representative of the execution paths; and
logic for distributing the threads among a plurality of computation resources such that aggregate the computation resource requirements of the computational threads are approximately evenly balanced among the plurality of computation resources.

10. A system according to claim 9, wherein the logic for statically analyzing the validation toolkit environment comprises at least one of:
logic for analyzing a model generator of the validation toolkit environment;
logic for analyzing a model generated by the model generator; and
logic for analyzing a validation toolkit of the validation toolkit environment.

11. A system according to claim 9, wherein computational requirements include at least one of computation time, processing requirements, and memory requirements.

12. A system according to claim 9, wherein the resources are components of a cloud computing environment.

* * * * *